US007926265B2

(12) United States Patent
Mueller et al.

(10) Patent No.: US 7,926,265 B2
(45) Date of Patent: Apr. 19, 2011

(54) HYDROSTATIC DRIVE

(75) Inventors: Matthias Mueller, Neusaess (DE); Steffen Mutschler, Ulm (DE)

(73) Assignee: Bosch Rexroth AG, Stuttgart (DE)

( * ) Notice: Subject to any disclaimer, the term of this patent is extended or adjusted under 35 U.S.C. 154(b) by 459 days.

(21) Appl. No.: 11/989,651

(22) PCT Filed: Dec. 19, 2006

(86) PCT No.: PCT/EP2006/012260
§ 371 (c)(1),
(2), (4) Date: Jan. 29, 2008

(87) PCT Pub. No.: WO2007/079935
PCT Pub. Date: Jul. 19, 2007

(65) Prior Publication Data
US 2009/0084102 A1 Apr. 2, 2009

(30) Foreign Application Priority Data

Dec. 23, 2005 (DE) .................. 10 2005 061 991

(51) Int. Cl.
*F16D 31/02* (2006.01)
(52) U.S. Cl. .................. 60/464; 60/414; 60/416
(58) Field of Classification Search .................. 60/414, 60/416, 464, 487, 488, 489; 180/165
See application file for complete search history.

(56) References Cited

U.S. PATENT DOCUMENTS

| | | | | | |
|---|---|---|---|---|---|
| 4,679,396 | A | * | 7/1987 | Heggie | 60/414 |
| 4,760,697 | A | * | 8/1988 | Heggie et al. | 180/165 |
| 4,813,510 | A | * | 3/1989 | Lexen | 60/414 |
| 6,971,463 | B2 | * | 12/2005 | Shore et al. | 180/165 |
| 7,082,757 | B2 | * | 8/2006 | Teslak et al. | 60/414 |

FOREIGN PATENT DOCUMENTS

| | | |
|---|---|---|
| AT | 395 960 B | 4/1993 |
| DE | 29 49 337 A1 | 6/1980 |
| EP | 1 433 648 A2 | 6/2004 |

\* cited by examiner

*Primary Examiner* — Michael Leslie
(74) *Attorney, Agent, or Firm* — Scully, Scott, Murphy & Presser, P.C.

(57) ABSTRACT

The invention relates to a hydrostatic drive. The hydrostatic drive (1) includes a hydraulic pump (3) and a hydraulic motor (7). The hydraulic pump (3) may be connected by way of a first working line (5) to a first working line connection (8) of the hydraulic motor (7) and by way of a second working line (6) to a second working line connection (9) of the hydraulic motor (7). Furthermore, the hydrostatic drive (1) includes a first storage means (40) for storing pressure energy and a second storage means (41). For recovery of the pressure energy stored in the first storage means, the latter may be connected, at least for one direction of conveying, to a first or second working line (5, 6) which is on the suction side in relation to the hydraulic pump (3) in this direction of conveying.

10 Claims, 3 Drawing Sheets

HYDROSTATIC DRIVE

The invention relates to a hydrostatic drive with recovery of stored energy.

Hydrostatic drives are frequently used to drive commercial vehicles. In this case, it is possible to store some of the kinetic energy during the braking procedure by way of the hydrostatic drive and then to recover it. AT 395 960 B proposes using a hydrostatic drive in a closed circuit with a hydraulic pump which is provided for conveying only in one direction. The working line on the conveying side, connecting the hydraulic pump to the hydraulic motor, is connected to a high-pressure storage means. A second storage means which takes the form of a low-pressure storage means and is connected to the working line on the suction side, in relation to the hydraulic pump, is provided. The high-pressure storage means and the low-pressure storage means are permanently connected to the working line on the conveying side and the suction side respectively. In normal driving mode, the hydraulic pump conveys flow into the working line on the conveying side. The hydraulic motor is adjustable, and is pivoted in a first direction for driving. If the vehicle goes into overrun mode, first the intake volume of the hydraulic motor is adjusted so that it approaches zero. To achieve a braking effect, the hydraulic motor is then pivoted in the opposite direction. Consequently, the hydraulic motor conveys flow into the working line which is on the conveying side, in relation to the hydraulic pump.

To prevent pressurised medium from flowing into the hydraulic pump in the opposite direction to that of conveying of the hydraulic pump, a nonreturn valve is provided in the working line. The pressurised medium conveyed by the hydraulic motor is accordingly conveyed into the high-pressure storage means. This means that if the pressure rises in the high-pressure storage means the kinetic energy of the vehicle is converted to pressure energy. The volume of flow is compensated by removing pressurised medium from the low-pressure storage means.

If the stored energy is to be recovered, pressurised medium is removed from the high-pressure storage means. As in the previous driving mode, the hydraulic motor is now pivoted back into its first direction. When the pressure of the pressurised medium is relieved by way of the hydraulic motor, an output moment is generated by the hydraulic motor. The pressurised medium conveyed through the hydraulic motor is conveyed to the low-pressure storage means by compensating the volume.

With the known drive it is disadvantageous that, to remove the pressurised medium, the pressurised medium acts directly on the hydraulic motor from the high-pressure storage means. With the proposed drive with recovery of kinetic energy, the hydraulic motor must additionally be pivoted beyond its neutral position. This reverses the direction of some of the flow in the hydraulic circuit. Directly supplying the pressurised medium to the hydraulic motor does not allow the moments to be added together by using the pressure in the high-pressure storage means and the torque of a motor driving the hydraulic pump.

It is an object of the invention to provide a hydrostatic drive in which it is possible to recover the stored energy and at the same time to supply a drive moment using a drive motor.

The object is achieved by the hydrostatic drive according to the invention having the features of claim 1.

The hydrostatic drive according to the invention includes a hydraulic pump which may be connected by way of a first working line to a first working line connection and by way of a second working line to a second working line connection of a hydraulic motor. Furthermore, the hydrostatic drive includes a first storage means, for storing pressure energy, and a second storage means. For recovery of pressure energy stored in the first storage means, the first storage means may be connected, at least for one direction of conveying of the hydraulic pump, to that first or second working line which is on the suction side in this direction of conveying. The hydrostatic drive according to the invention has the advantage that the pressurised medium from the first storage means, in which the pressurised medium is stored at high pressure, is supplied by way of the working line connected to the hydraulic pump on the suction side. This makes it possible to add the moments together, since in addition to increasing the pressure of the hydraulic pump on the suction side, it is possible for a drive moment of a drive motor driving the hydraulic pump to act on the hydraulic pump. Returning the kinetic energy, stored in the form of pressure energy, of the vehicle is thus performed not directly at the hydraulic motor but indirectly. The hydraulic motor itself, by contrast, is only acted upon by the working line pressure generated by the hydraulic pump, as is also conventional in normal driving mode.

Advantageous developments of the invention are given in the sub-claims.

For example, it is advantageous, for recovery of the pressure energy stored in the first storage means, to enable compensation of the volume of flow in that the respectively downstream working line connection of the hydraulic motor may be connected to the second storage means. By connecting the downstream connection of the hydraulic pump to the second storage means, a hydraulic balance is produced in which pressurised medium is removed from the first storage means and conveyed by way of the hydraulic pump and the hydraulic motor, which are arranged in series with one another in this configuration, to the low-pressure storage means.

It is furthermore advantageous, for charging the first storage means during a braking procedure, if that first or second working line connection of the hydraulic motor which is downstream for at least one direction of flow may be connected to the first storage means. The fact that it is possible in this way to connect the first storage means to the downstream connection of the hydraulic motor makes it possible to charge the first storage means without reversing the direction of flow in the hydraulic circuit. For making the connections between the working line connections and the first and second working line and between the first and second storage means and the first working line or second working line and the first working line connection or second working line connection, seat valves are advantageously used. According to a further preferred embodiment, pilot valves act on the seat valves by means of a control pressure.

Furthermore, the second storage means is preferably connected to a pressure holding line. The pressure holding line may be connected to a pressurised medium source. The fact that it is possible to connect a pressurised medium source by way of the pressure holding line to the second storage means has the effect that a minimum pressure in the second storage means can always be ensured. This is particularly advantageous in order that pressurised medium which is lost, for example, through leakage can be topped up again from the pressurised medium source.

It is particularly preferred if the pressurised medium source is a feed device. The use of the feed device as the pressurised medium source for the second storage means makes it possible to use the feed device both for charging the hydraulic circuit by means of the first and second working lines and for maintaining a minimum pressure in the second storage means. In this case, the feed device preferably includes a feed pump conveying flow into the feed line. It is particularly preferable if the feed line may be connected to the pressure holding line by way of a switch valve. This means that if the pressure in the second storage means falls as a result of actuating the switch valve, pressurised medium may be fed from the feed line by way of the pressure holding line to the second storage means. When sufficient pressure is present in the second storage means, the connection between the feed line and the pressure holding line may be broken in a simple manner by the switch valve.

It is also advantageous if the feed line is directly connected to the pressure holding line by way of a nonreturn valve. In this arrangement, the valve opens towards the pressure holding line. This means that pressure built up in the second storage means cannot escape into the feed system. The feed system then merely compensates for leakage. Otherwise, when there is sufficient pressure in the hydraulic system, the hydraulic circuit is uncoupled from the feed system.

According to a further preferred embodiment, the first storage means and the second storage means may be directly connected to one another by way of a storage pressure limiting valve. If the high-pressure storage means is already completely full, hydraulic braking can still be performed. In this case, the storage pressure limiting valve opens, and the pressure of the pressurised medium conveyed by the hydraulic motor is relieved in the direction of the second storage means, by way of the storage pressure limiting valve. A closed hydraulic circuit is thus produced, with the result that no compensation of volume is required.

Preferred example embodiments of the hydrostatic drive according to the invention are illustrated in the drawing and explained in more detail in the description below. In the drawing.

Figure 1:
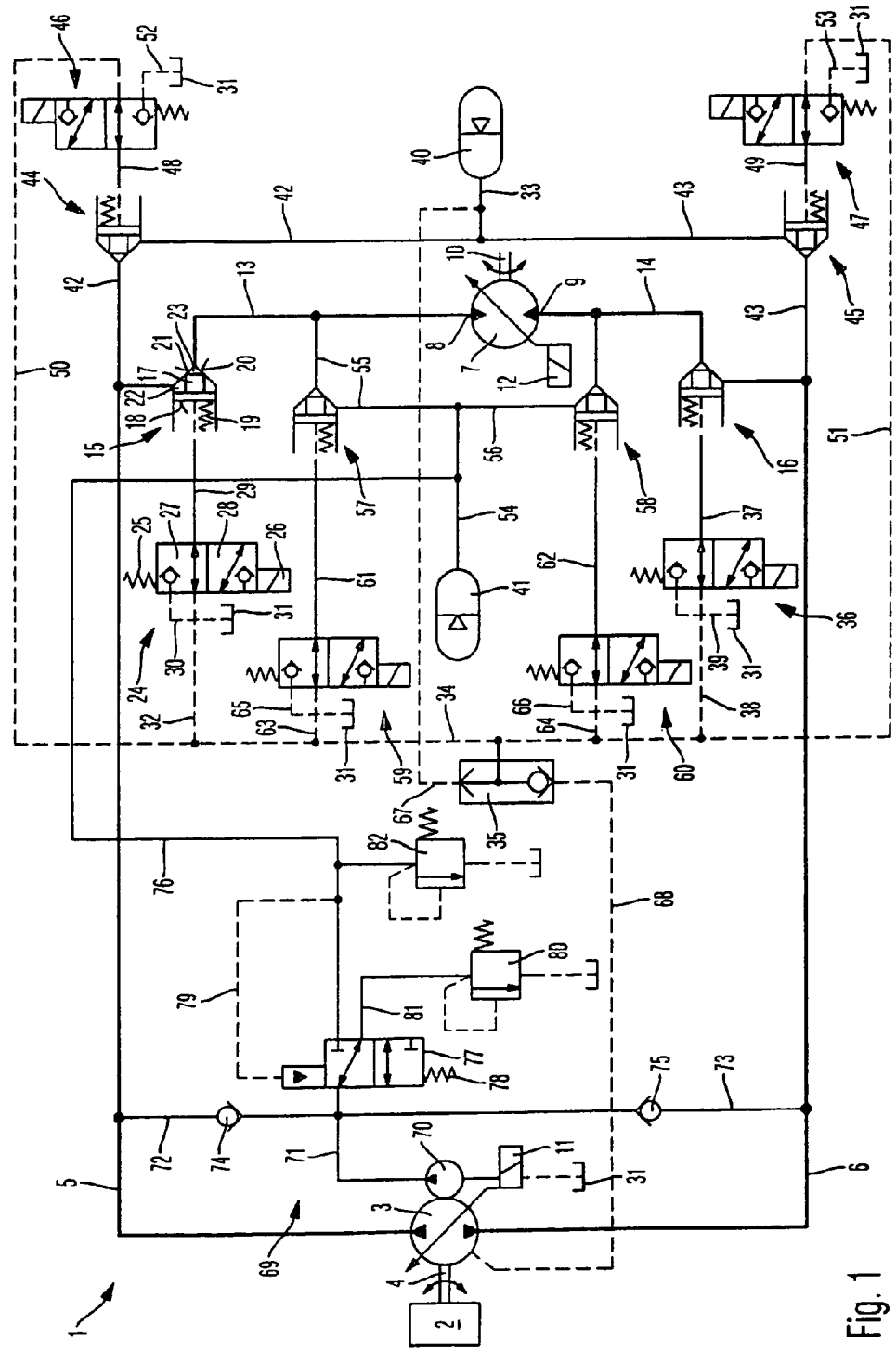
FIG. 1 shows a diagrammatic illustration of a first exemplary embodiment of a hydrostatic drive according to the invention.

FIG. 1 shows a diagrammatic illustration of a hydrostatic drive 1 according to the invention. The hydrostatic drive 1 according to the invention may, for example, be a drive mechanism of a commercial vehicle. However, the invention is not restricted to commercial vehicles. Rather, any drives in which a hydrostatic gear is used may be constructed in the embodiment according to the invention.

The hydrostatic drive 1 includes a drive motor 2. The drive motor 2 drives a hydraulic pump 3 by way of a drive shaft 4. The hydraulic pump 3 is an adjustable hydrostatic piston engine which is designed for conveying in two directions. Depending on the direction of conveying set, the hydraulic pump 3 conveys flow to a first working line 5 or a second working line 6. Connection of a hydraulic motor 7 is possible by means of the first working line 5 and the second working line 6. The hydraulic motor 7 has a first working line connection 8 and a second working line connection 9. The first working line connection 8 may be connected to the first working line 5. Accordingly, the second working line connection 9 may be connected to the second working line 6. If the first working line connection 8, as will be described below, and the second working line connection 9 are connected to the first working line 5 and the second working line 6 respectively, the hydraulic pump 3 and the hydraulic motor 7 are connected to one another in a closed hydraulic circuit. The output moment generated by the hydraulic motor 7 when the hydraulic motor 7 is acted upon is passed on through an output shaft 10, for example to a vehicle axle or a downstream switching gear.

To adjust the conveying volume of the hydraulic pump 3, a first adjusting device 11 is provided. Accordingly, the intake volume of the hydraulic motor 7 is adjusted by a second adjusting device 12. The first adjusting device 11 and the second adjusting device 12 each act on an adjusting mechanism of the hydraulic pump 3 and the hydraulic motor 7 respectively.

A first connection line 13 is connected to the first working line connection 8 of the hydraulic motor 7. The second working line connection 9 of the hydraulic motor 7 is connected to a second connection line 14. The first connection line 13 may be connected to the first working line 5 by way of a first seat valve 15. The second connection line 14 may be connected to the second working line 6 by way of a second seat valve 16.

All the seat valves in the hydrostatic circuit illustrated in FIG. 1 are of the same construction. For the sake of clarity, only the structure of the first seat valve 15 will be discussed in detail below.

The first seat valve 15 has a piston 17. The piston 17 has a control face 18 which may be acted upon by pressure. The force of a closing spring 19 also acts on the control face 18. Thus, both a hydraulic force, as a result of a control pressure, and the force of the closing spring 19 act on the control face 18 and urge the first seat valve 15 in the direction of closing. A sealing edge 20 is formed on the piston 17 and cooperates in sealing manner with a sealing seating 21. A first chamber 22 and a second chamber 23 in the first seat valve 15 are separated from one another when the seat valve 15 is closed. The pressure of the first working line 5 and the pressure of the first connection line 13 act in the first chamber 22 and the second chamber 23 respectively. The pressures prevailing in the first chamber 22 and the second chamber 23 act on the piston 17 with a hydraulic force which acts in the direction of opening the first seat valve 15. If the hydraulic force on the control face 18 is reduced, the hydraulic force in the first chamber 22 and the second chamber 23 is greater than the force of the closing spring 19 acting in the direction of closing, and the first seat valve 15 is brought into its opened position. In the opened position of the first seat valve 15, the first chamber 22 and the second chamber 23 are connected to one another, with the result that a connection is made between the first working line 5 and the first connection line 13 through which flow is possible. When the first seat valve 15 is opened, therefore, when pressurised medium is conveyed through the hydraulic pump 3 into the first working line 5, the first working line connection 8 of the hydraulic motor 7 is acted upon by pressurised medium.

In order to affect the control pressure acting on the control face 18 of the first seat valve 1S, a first pilot valve 24 is provided. The first pilot valve 24 is a 3/2-way valve and it is acted upon in a first direction by the force of a valve spring 25. The force of an electromagnet 26 acts in the opposite direction. A different actuator from the electromagnet 26 may also be used. It is also possible for a hydraulic force to act on the first pilot valve 24 in opposition to the force of the valve spring 25. The first pilot valve 24 is brought into its first switch position 27 or its second switch position 28 as a function of the relationship between the forces of the valve spring 25 and the electromagnet 26. Here, the valve spring 25 urges the first pilot valve 24 in the direction of its first switch position 27. In the first switch position 27, the first pilot valve 25 connects a first control pressure line 29 to a first pressure supply line branch 32.

In the first switch position 27 of the first pilot valve 24, the pressure prevailing in the first pressure supply line branch 32 is thus supplied by way of the first control pressure line 29 connected therewith to the control face 18 of the first seat valve 15. Consequently, if the first pilot valve 24 is in the first switch position 27 predetermined by the valve spring 25, the first seat valve 15 is urged in the direction of closing. By contrast, if the electromagnet 26 acts by means of a control signal, then a force which brings the first pilot valve 24 into its second switch position 28, in opposition to the force of the valve spring 25, acts on the first pilot valve 24 as a result of the electromagnet 26. In the second switch position 28, the first control pressure line 29 is connected to a first pressure relief line 30. The pressure prevailing in the first control pressure line 29 is relieved into a tank space 31 by way of the first pressure relief line 30. Accordingly, the hydraulic force acting on the control face 18 of the first seat valve 15 falls and the first seat valve 15 is brought into its opened position by the hydraulic force in the first chamber 22 and the second chamber 23. Applying current to the electromagnet 26 thus makes a connection between the first working line 5 and the first working line connection 8.

The pressure required to generate the control force on the control face 18 is supplied by way of the first pressure supply line branch 32 and the first pilot valve 24. For this purpose, the first pressure supply line branch 32 is connected to a pressure supply line 34. The pressure supply line 34 is connected to an output from a changeover valve 35. The changeover valve 35 has the effect that in each case the highest pressure available in the system is provided, in the manner described below.

To activate the second seat valve 16, a second pilot valve 36 is provided. The second pilot valve 36 is of a structure comparable with the first pilot valve 24. For the sake of clarity, a repeated description will be omitted. A second control pressure line 27 may be connected to a second pressure supply line branch 38 by the second pilot valve 36. The second pilot valve 36 is also held in this position by a spring. If the second pilot valve 36 is acted upon by a control signal at an electromagnet, it is brought into its second switch position, in which the second control pressure line 37 is connected to a second pressure relief line 39. When the second pilot valve 36 is acted upon by a control signal, the control pressure acting on the control face of the second seat valve 16 is consequently reduced in that the pressure of the second control pressure line 27 is relieved into the tank space 31. Consequently, the second seat valve 16 is brought into its opened position when a control signal is applied to the pilot valve 36. In the opened position of the second seat valve 16, the second connection line 14 and the second working line 6 are connected to one another.

In normal driving mode, a control signal acts on both the first pilot valve 24 and the second pilot valve 36. Pressure from the first control pressure line 29 and the second control pressure line 37 is consequently relieved into the tank space 31, and the first seat valve 15 and the second seat valve 16 are brought into their respective open positions. This creates a closed hydraulic circuit, in that the hydraulic pump 3 and the hydraulic motor 7 are arranged in the form of a hydrostatic gear in a manner known per se. The transmission ratio of the hydrostatic gear is adjusted by adjusting the conveying volume of the hydraulic pump 3 or the intake volume of the hydraulic motor 7 by means of the first adjusting device 11 and the second adjusting device 12 respectively.

The hydrostatic drive 1 according to the invention furthermore includes a first storage means 40 and a second storage means 41. The first storage means 40 takes the form of a high-pressure storage means. The second storage means 41 takes the form of a low-pressure storage means. Preferably, both storage means 40, 41 take the form of hydraulic/pneumatic storage means in which a compressible volume is compressed when pressurised medium is supplied.

The first storage means 40 may be connected to the hydrostatic circuit by way of a high-pressure storage line 33. The high-pressure storage line 33 branches into a first high-pressure storage line branch 42 and a second high-pressure storage line branch 43. Arranged in the first high-pressure storage line branch 42 is a third seat valve 44. Arranged in the second high-pressure storage line branch 43 is a fourth seat valve 45. It is also possible for the third seat valve 44 and the fourth seat valve 45 to be acted upon in the direction of closing, by the control pressure through a third control pressure line 48 and a fourth control pressure line 49 respectively. A closing spring acts on the third seat valve 44 and the fourth seat valve 45 respectively, again in the direction of closing.

If the third seat valve 44 is in its closed position, the first high-pressure storage line branch 42 is interrupted. If the fourth seat valve 45 is in its closed position, the second high-pressure storage line branch 43 is interrupted.

The first high-pressure storage line branch 42 opens into the first working line 5. The second high-pressure storage line branch 43 correspondingly opens into the second working line 6. If the third seat valve 44 and the fourth seat valve 45 are each in their closed position, there is no connection from the first working line 5 to the first storage means 40 through which flow is possible, nor is there any connection from the second working line 6 to the first storage means 40.

In a first switch position of a third pilot valve 46, the third control pressure line 48 is connected to a third pressure supply line branch 50. The third pilot valve 46 is acted upon by a valve spring in the direction of this switch position. An electromagnet, for its part, acts in the opposite direction and can urge the third pilot valve 46 with a force in opposition to the force of the valve spring, in the manner already described. If the electromagnet is acted upon by a control signal, it brings the third pilot valve 46 into its second switch position. The third control pressure line 48 is connected to a third pressure relief line 52 in this position, with the result that the pressure of the third control pressure line 48 is relieved into the tank space 31. This brings the third seat valve 44 into its opened position as a result of the pressure prevailing in the first high-pressure storage line branch 42. In the opened position of the third seat valve 44, the first working line 5 is connected to the first storage means 40 by way of the first high-pressure storage line branch 42 and the high-pressure storage line 33.

In accordance with the arrangement described above, the fourth seat valve 45 may also be activated by a fourth pilot valve 47. A fourth control pressure line 49 may be connected either to a fourth pressure supply line branch 51 or to a fourth pressure relief line 53 by way of the fourth pilot valve 47. In the rest position of the fourth pilot valve 47, the fourth pilot valve 47 connects the fourth control pressure line 49 to the fourth pressure supply line branch 51. When an electromagnet is active, the fourth pilot valve 47 is moved into its second switch position, in which the fourth control pressure line 49 is connected to the fourth pressure relief line 53. In the manner already described, this results in opening of the fourth seat valve 45. In the opened position of the seat valve 45, the second working line 6 is connected to the first storage means 40 by way of the second high-pressure storage line branch 43.

The second storage means 41 takes the form of a low-pressure storage means and may be connected to the hydraulic circuit by way of a low-pressure storage line 54. The low-pressure storage line 54 branches into a first low-pressure storage line branch 55 and a second low-pressure storage line branch 56. Arranged in the first low-pressure storage line branch 55 is a fifth seat valve 57. Arranged in the second low-pressure storage line branch 56 is a sixth seat valve 58. The first low-pressure storage line branch 55 opens into the first connection line 13. The second low-pressure storage line branch 56 opens into the second connection line 14. Thus, when the fifth seat valve 57 is in the closed position, the connection between the first connection line 13 and the low-pressure storage line 54 is interrupted. Similarly, the sixth seat valve 58 interrupts the connection between the second connection line 14 and the low-pressure storage line 54.

The fifth seat valve 57 is activated by a fifth pilot valve 59. In order to apply a hydraulic force to the fifth seat valve 57 in the direction of closing, the fifth pilot valve 59 connects a fifth control pressure line 61 to a fifth pressure supply line branch 63. By contrast, if a control force is applied to the fifth pilot valve 59 at an electromagnet, the fifth pilot valve 59 is brought, in opposition to the force of its valve spring, into its second switch position, in which the fifth control pressure line 51 is connected to a fifth pressure relief line 65. As a consequence of the relief of the pressure prevailing in the fifth control pressure line 61 into the tank space 31, the fifth seat valve 57 opens and the first connection line 13 is connected by way of the first low-pressure storage line branch 55 to the low-pressure storage line 54 and hence to the second storage means 41.

In a corresponding manner, the sixth seat valve 58 is activated by a sixth pilot valve 60. In its rest position, which is once again defined by a valve spring, a sixth control pressure line 62 is connected by the sixth pilot valve 60 to a sixth pressure supply line branch 64.

If, by contrast, a control signal acts on the sixth pilot valve 60, it is brought into its other limit position by an electromagnet, in opposition to the force of the valve spring. In this limit position, the sixth control pressure line 62 is connected to a sixth pressure relief line 66. The pressurised medium which escapes from the sixth control pressure line 62 by way of the sixth pressure relief line 60 into the tank space 31 results in a reduction of the control force acting on the sixth seat valve 58. By reducing the control force acting on the sixth seat valve 58 in its direction of closing, the forces acting in the opposite direction and generated by the pressures in the second low-pressure storage line branch 56 are outweighed. Consequently, the sixth seat valve 58 is brought into its opened position, in which there is a connection through which flow is possible with the second low-pressure storage line branch 56.

The first to sixth pressure supply line branches 32, 38, 50, 51, 63 and 64 are connected to a pressure supply line 34. The pressure supply line 34 is connected to an output of the changeover valve 35. A storage connection line 67 and a motor connection line 68 open into the two inputs of the changeover valve 35 respectively. The pressure prevailing in the high-pressure storage line 33 and hence the pressure prevailing in the first storage means 40 act on the input of the changeover valve 35 by way of the storage connection line 67. At the other input of the changeover valve 35, the respectively higher one of the pressures of the first and second working lines 5, 6 acts by way of the pump connection line 68. This means that the changeover valve 35 makes available at its output the respectively highest pressure available in the system for activating the seat valves 15, 16, 44, 45, 57, 58.

The hydrostatic drive 1 furthermore includes a feed device 69. The feed device 69 has a feed pump 70. The feed pump 70 is provided for conveying in only one direction and preferably takes the form of a constant flow pump. The feed pump 70 is arranged, together with the adjustable hydraulic pump 3, on the drive shaft 4 and is thus driven by way of the drive motor 2. The feed pump 70 draws pressurised medium up out of the tank space 31 and conveys it into a feed line 71. The feed line 71 branches into a first feed line branch 72, connected to the first working line 5, and a second feed line branch 73, connected to the second working line 6. A first nonreturn valve 74 is provided in the first feed line branch 72. A second nonreturn valve 75 is provided in the second feed line branch 73. The two nonreturn valves 74 and 75 are arranged such that they open in the direction of the first working line 5 and the second working line 6 respectively if the pressure in the feed line 71 is greater than the respective working line pressure in the first working line 5 and the second working line 6.

To protect the hydrostatic drive 1, a respective pressure limiting valve may be arranged, in each case in parallel, as an extension to the first nonreturn valve 74 and the second nonreturn valve 75, and these relieve pressure in the respective working line 5, 6 in the direction of the feed line 71 in the event of critically high pressure.

The feed device 69 may be connected to the second storage means 41 by way of a pressure holding line 76. For this, the pressure holding line 76 connects an output of a switch valve 77 to the low-pressure storage line 54. The switch valve 77 is in a first or a second switch position, depending on the force of a pressure spring 78 and a hydraulic force acting in the opposite direction. If the hydraulic force is greater than the force of the pressure spring 78, the switch valve 77 connects the feed line 71 to a drainage line 81. The drainage line 81 may be connected to the tank space 31 by way of a first pressure limiting valve 80. If the hydraulic force at the switch valve 77 falls below the force of the pressure spring 78, the pressure spring 78 pushes the switch valve 77 into its other switch position, in which the feed line 71 is connected to the pressure holding line 76.

The pressure of the pressure holding line 76 is supplied to the measuring face through the comparison line 79. In this way, the switch valve 77 is switched to its first or second switch position in dependence on the pressure prevailing in the second storage means 41. The pressure holding line 76 may be connected to the tank space 31 by way of a second pressure limiting valve 82.

As soon as the pressure in the second storage means 41 falls below a value set by the pressure spring 78, the switch valve 77 is brought into a switch position in which the feed line 71 is connected to the pressure holding line 76. In this switch position, pressurised medium is conveyed into the second storage means 41 by the feed pump 70. Consequently, the pressure in the second storage means 41 rises until sufficient pressure is reached and consequently the hydraulic force acting on the switch valve 77 brings the switch valve 77 into its opposite switch position. In this opposite switch position, the pressure prevailing in the feed device 69 is limited by the pressure limiting valve 80. Preferably, the first pressure limiting valve 80 is adjusted for example to 20 bar. The second pressure limiting valve 82, by contrast, is adjusted to a higher pressure, for example 40 bar, which corresponds to the switching pressure of the switch valve 77.

With the aid of the connection between the feed device 69 and the second storage means 41, it is thus ensured that pressurised medium which escapes from the circuit as a result of leakage during a regenerative operation of the hydrostatic drive 1 is supplied again.

As has already been stated at the outset, in normal driving mode a closed hydraulic circuit is provided in which the hydraulic pump 3 and the hydraulic motor 7 are arranged. For this purpose, a control signal acts on the first pilot valve 24 and the second pilot valve 36. The first seat valve 15 and the second seat valve 16 are in their opened positions, and the closed hydraulic circuit comprises the first working line 5, the first connection line 13, the second connection line 14 and the second working line 6. In the description below, it is assumed that forward travel means that pressurised medium is conveyed into the first working line 5 by the hydraulic pump 3. Accordingly, during forward travel the first working line 5 is the working line on the conveying side, and the second working line 6 is the working line on the suction side.

Taking as a starting point forward travel, the vehicle concerned is first to go into overrun mode and be braked. In overrun mode, the first storage means 40 is used to store kinetic energy of the vehicle. For this reason, pressurised medium has to be conveyed by the hydraulic motor 7, which now acts as a pump, to the first storage means 40. During the braking procedure, pressurised medium is removed from the second storage means 41 and pumped into the first storage means 40 by the hydraulic motor 7. For this, in the case of the forward travel described, a control signal acts on the fifth pilot valve 59. Consequently, the fifth seat valve 57 is in its opened position and pressurised medium may be drawn up, by way of the first low-pressure storage line branch 55, out of the second storage means 41 by the hydraulic motor 7 at the first working line connection 8 thereof. The pressurised medium drawn up out of the second storage means 41 by the hydraulic motor 7 is conveyed by the hydraulic motor 7 into the second connection line 14.

A control signal also acts on the second pilot valve 36, with the result that the second seat valve 16 is also in its opened position. Furthermore, a control signal acts on the fourth pilot valve 47, and the fourth seat valve 45 is also brought into its opened position by the pressure of the second high-pressure storage line branch 43. By contrast, the other pilot valves 46, 24 and 60 are only acted upon by way of their respective valve springs, and the associated seat valves 44, 15 and 58 are in their closed positions.

The pressurised medium conveyed by the hydraulic motor 7 is consequently conveyed through the second connection line 14 in the direction of the second working line 6 and on through the second high-pressure storage line branch 43 into the first storage means 40.

After a braking procedure of this kind, pressurised medium is stored in the first storage means 40 at high pressure. Here, the stored pressure energy is produced by the kinetic energy of the vehicle being let down. If, after a braking procedure as described, during forward travel acceleration in the direction of forward travel is required once again, the pressurised medium must be supplied to the hydrostatic drive 1 from the first storage means 40 in a suitable manner. According to the invention, the pressurised medium is removed from the first storage means 40 into the respective working line on the suction side. The working line on the suction side is in each case the second working line 6, in the case of forward travel. To remove pressurised medium and accordingly to recover energy, a control signal acts on the fourth pilot valve 47. The fourth seat valve 45 is brought into the opened position and the pressurised medium from the first storage means 40 is supplied to the second working line 6 and hence to the suction side of the hydraulic pump 3. The hydraulic pump 3 thus draws flow out of the second working line 6, which is under an initial pressure, and can additionally be acted upon by the torque of the drive motor 2. This has the result that the moments are added together and the drive motor 2 can be operated at lower power. The result is a saving on fuel. The working line pressure in the first working line 5 acts on the hydraulic motor 7. For this, a control signal acts on the first pilot valve 24, with the result that the first seat valve 15 is in its opened position. The first working line connection 8 of the hydraulic motor 7 is thus connected to the working line 5 on the conveying side. The pressurised medium emerging downstream from the hydraulic motor 7 at the second working line connection 9 is relieved of pressure at the output shaft 10, generating an output torque, and is conveyed into the second storage means 41 by way of the opened sixth seat valve 58. To open the sixth seat valve 58, a control signal acts on the sixth pilot valve 60. The other seat valves (16, 44 and 57) are each in their closed position, in which no control signal acts on the associated pilot valves (36, 46 and 59).

Accordingly, both the storage of kinetic energy and the recovery of kinetic energy are possible during backward travel. Backward travel results in a reversal of the working line on the suction and conveying sides in relation to the hydraulic pump 3. Accordingly, and starting from the example described above, during backward travel the second working line 6 is the working line on the conveying side, in relation to the hydraulic pump 3, and the first working line 5 becomes the working line on the suction side in relation to the hydraulic pump 3. Consequently, the direction of flow through the hydraulic motor 7 is also changed, with the result that during backward travel the first working line connection 8 of the hydraulic motor 7 is the downstream working line connection, and the second working line connection 9 is the upstream working line connection of the hydraulic motor 7. To present the respective switch conditions clearly once again, for forward and backward travel both an acceleration procedure and a braking procedure are presented in the table below. For the sake of simplicity, only the pilot valves on which a control signal acts are given. This means that none of the other pilot valves receives a control signal, and the seat valves associated therewith are in the closed position.

|  | With current flow (pilot valve) | Open (seat valve) |
| --- | --- | --- |
| Forwards with acceleration | 24, 47, 60 | 15, 45, 58 |
| Forwards with braking | 36, 47, 59 | 16, 45, 57 |
| Backwards with acceleration | 36, 46, 59 | 16, 44, 57 |
| Backwards with braking | 24, 46, 60 | 15, 44, 58 |

Figure 2:
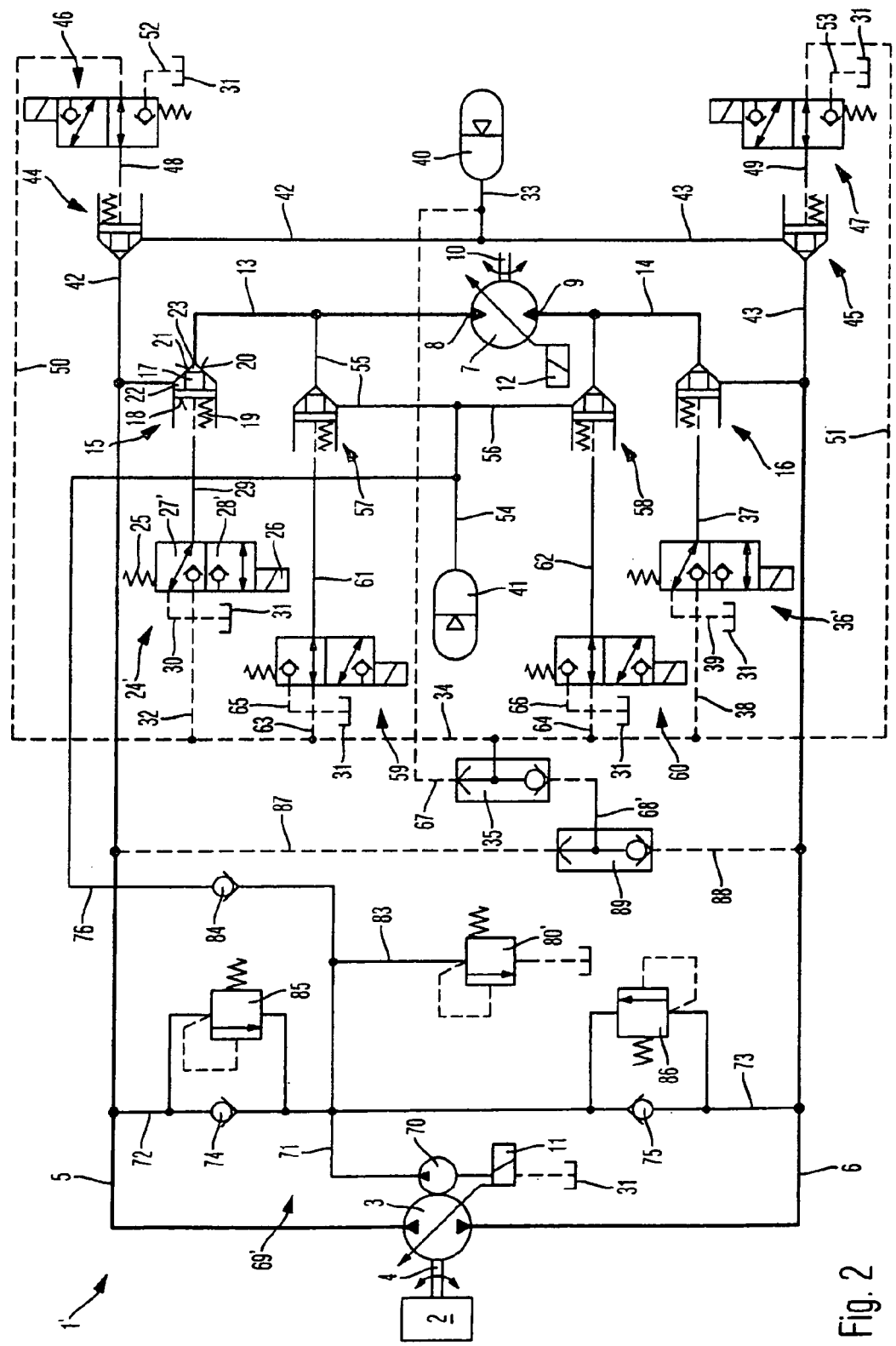
FIG. 2 shows a diagrammatic illustration of a second exemplary embodiment of a hydrostatic drive according to the invention.

FIG. 2 illustrates a second exemplary embodiment of the hydrostatic drive 1' according to the invention. To avoid unnecessary repetition, like reference numerals are used for like components here. Any repeated description is omitted.

Unlike the exemplary embodiment in FIG. 1, in the case of the second exemplary embodiment in FIG. 2 only one feed pressure limiting valve 80' is provided, instead of the first pressure limiting valve 80 and the second pressure limiting valve 82. The feed pressure limiting valve 80' is connected to the feed line 71 by way of a feed pressure limiting line 83. Furthermore, the feed line 71 is connected to the pressure holding line 76. A third nonreturn valve 84 is provided at the transition from the feed line 71 to the pressure holding line 76. The nonreturn valve may advantageously be used in the exemplary embodiment of FIG. 1 as well.

The third nonreturn valve 84 opens in the direction of the pressure holding line 76. Pressure in the feed line 71 is limited to a maximum permissible feed pressure by the feed pressure limiting valve 80'. This is for example at 25 bar. If a pressure exceeding this maximum permissible feed pressure prevails in the second storage means 41, the third nonreturn valve 84 returns to its closed position and so disconnects the second storage means 41 from the modified feed device 69'. However, if the pressure in the second storage means 41 has fallen below the feed pressure, for example because of leakage, the third nonreturn valve 84 opens and the second storage means 41 is filled, with the aid of the feed pump 70, from the modified feed device 69'.

Furthermore, and in contrast to the exemplary embodiment in FIG. 1, the respectively higher one of the two working line pressures in the first working line 5 and the second working line 6 is not supplied to the changeover valve 35 directly by way of the hydraulic pump 3. Rather, a further changeover valve 89 is provided. The further changeover valve 89 is connected to the first working line 5 by way of a first changeover valve line 87. The further changeover valve 89 is connected to the second working line 6 by way of a second changeover valve line 88. The output of the further changeover valve 89, at which the respectively higher one of the two working line pressures applies, is connected to an input to the changeover valve 35 by way of a changeover valve connection line 68'. Thus, and as in the exemplary embodiment of FIG. 1, the higher one of the two working line pressures is compared with the pressure prevailing in the storage connection line 67 by way of the changeover valve 35 and supplied to the pressure supply line 34.

Furthermore, in the case of the first pilot valve 24' and the second pilot valve 36' of the second exemplary embodiment, by comparison with the first exemplary embodiment the first switch position 27' and the second switch position 28' have been interchanged. This means that in the rest condition of the first pilot valve 24', which is determined by the valve spring 25, the first pressure supply line branch 32 is connected to the first control pressure line 29. Accordingly, in the rest position of the second pilot valve 36' the second pressure supply line branch 38 is connected to the second control pressure line 37. The result is that in normal hydrostatic driving mode the first seat valve 15 and the second seat valve 16 are each in their opened position and the hydraulic pump 3 and the hydraulic motor 7 are connected to one another by way of the first working line 5, the second working line 6 and the first connection line 13 and the second connection line 14 in a simple closed hydraulic circuit. It is not necessary for current to flow through the electromagnets of the pilot valves 24' and 36'.

To protect the first working line 5 and the second working line 6 against excessive working line pressures, a first parallel pressure limiting valve 85 is arranged in parallel with the first nonreturn valve 74. The first parallel pressure limiting valve 85 opens in the direction of the feed line 71 if the pressure in the first working line 5 exceeds a value adjusted by means of a spring of the first parallel pressure limiting valve 85.

In a comparable manner, a second parallel pressure limiting valve 86 is provided. The second parallel pressure limiting valve 86 is arranged parallel to the first nonreturn valve 75. It opens if the pressure in the second working line 6 exceeds the critical value adjusted by means of a further spring at the second parallel pressure limiting valve 86.

Figure 3:
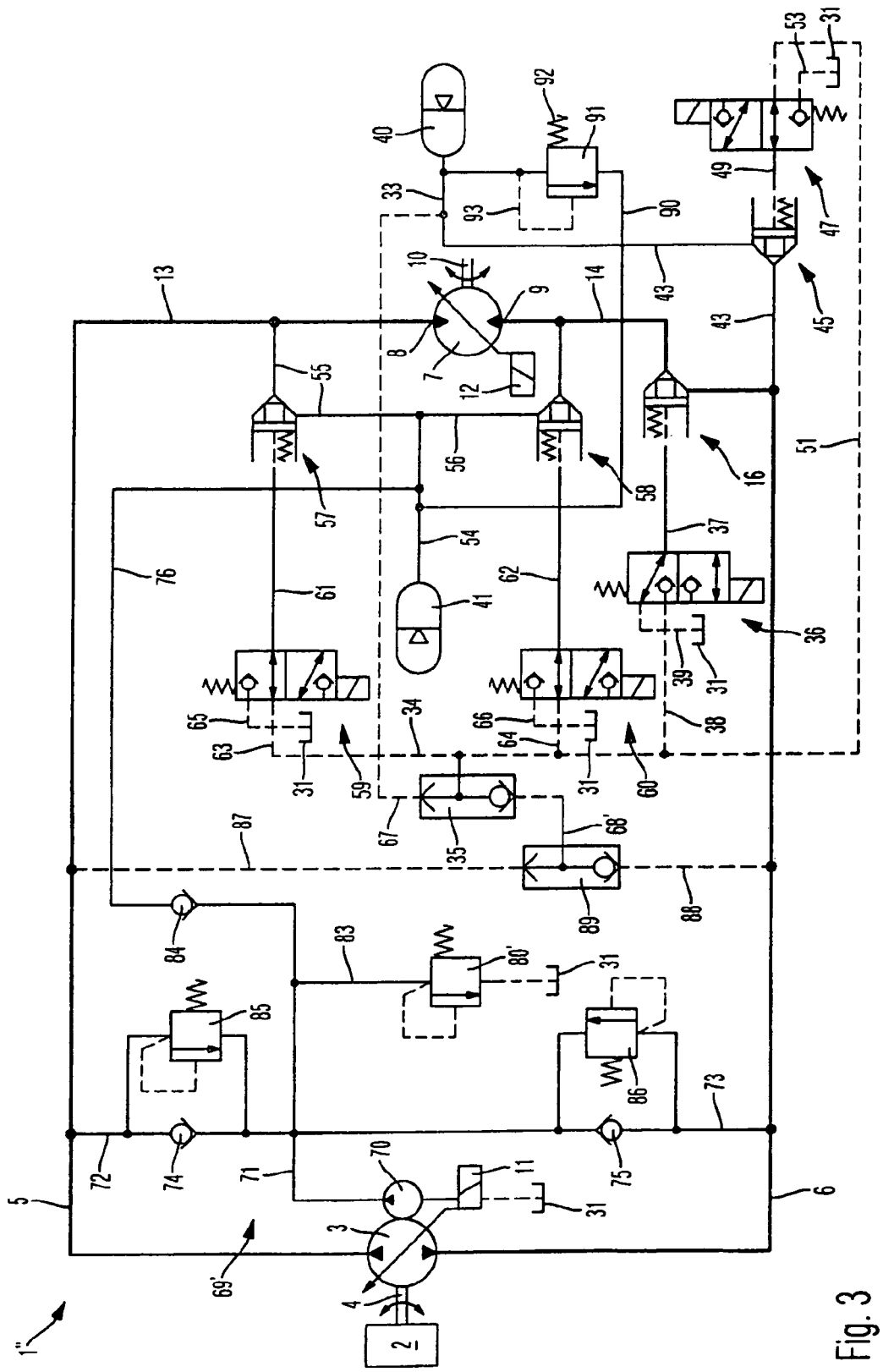
FIG. 3 shows a diagrammatic illustration of a third exemplary embodiment of a hydrostatic drive according to the invention.

In the case of the third exemplary embodiment of a hydrostatic drive 1" according to the invention, which is illustrated in FIG. 3, recovery of kinetic energy is only provided for one direction of travel. This direction of travel corresponds to the forward travel described above, in which the hydraulic pump 3 conveys flow into the first working line 5. The structural expense of a hydrostatic drive 1" of his kind, which only provides for energy recovery in one direction of travel, is reduced considerably. Thus, in particular the first pilot valve 24' and the first seat valve 15 are no longer required, and nor are the third pilot valve 46, the third seat valve 44 or the lines which are accordingly not required. The third exemplary embodiment shown in FIG. 3 is based on the exemplary embodiment shown in FIG. 2, so the other elements correspond to those already described in relation to FIG. 2.

In addition, in the exemplary embodiment of FIG. 3 a safety line 90 is provided. The safety line 90 connects the low-pressure storage line 54 to the high-pressure storage line 33. A storage pressure limiting valve 91 is arranged in the safety line 90. The storage pressure limiting valve 91 protects the first storage means 40 against an impermissible excess pressure. At the same time, it makes it possible for the hydrostatic drive 1" to continue to perform hydrostatic braking even if the first storage means 40 is already fully charged. For this, a storage pressure limiting valve spring 92 is used to adjust a limit value for the pressure in the first storage means 40. This limit value corresponds to the pressure in the first storage means 40 when the first storage means 40 is in its maximum charge condition.

The storage pressure of the first storage means 40, prevailing in the high-pressure storage line 33, which is connected to the safety line 90, is supplied by way of a measuring line 93 to a pressure measuring face of the storage pressure limiting valve 91. The hydrostatic pressure generated there acts in opposition to the force of the storage pressure limiting valve spring 92. If the first storage means 40 is completely full, the storage pressure limiting valve 91 opens and connects the high-pressure storage line 33 to the low-pressure storage line 54. This means that in overrun mode, the hydraulic motor 7 no longer conveys the pressurised medium into the first storage element 40 but by way of the safety line 90 and the storage pressure limiting valve 91 arranged therein back into the low-pressure storage line 54. A closed hydraulic circuit is thus produced in which the storage pressure limiting valve 91 throttles the volume of flow and so a braking effect is created. This means that even if the first storage means 40 is fully charged, hydrostatic braking can still be carried out without the need to compensate volume.

The invention is not restricted to the exemplary embodiment shown. Rather, individual features of the exemplary embodiments may also be combined with one another.

The invention claimed is:

1. A hydrostatic drive, including a hydraulic pump which may be connected by way of a first working line to a first working line connection and by way of a second working line to a second working line connection of a hydraulic motor, and including a first storage means for storing pressure energy and a second storage means,
    wherein, for recovery of the pressure energy stored in the first storage means, the first storage means may be connected, at least for one direction of conveying of the hydraulic pump, to that first or second working line which is on the suction side in this direction of conveying, and
    wherein the hydrostatic drive further includes a tank space and a pressurized medium source for drawing pressurized medium up out of the tank space, and wherein the first storage means and the second storage means may be directly connected to one another by way of a storage pressure limiting valve.

2. A hydrostatic drive according to claim 1, wherein, for recovery of the pressure energy stored in the first storage means, the upstream first or second working line connection may be connected to that first or second working line which is on the conveying side in relation to the hydraulic pump, and the respectively other, downstream working line connection may be connected to the second storage means.

3. A hydrostatic drive according to claim 1, wherein, for charging the first storage means, the first storage means may be connected, at least for one direction of flow, to the downstream first or second working line connection of the hydraulic motor, and the upstream second or first working line connection of the hydraulic motor may be connected to the second storage means.

4. A hydrostatic drive according to claim 1, wherein, for connecting the first storage means to the first or second working line and/or for connecting the second storage means to the first or second working line connection and/or for connecting the first or second working line connection to the first or second working line respectively, a respective seat valve is provided.

5. A hydrostatic drive according to claim 4, wherein a respective pilot valve may act on the seat valves with a control pressure.

6. A hydrostatic drive according to claim 1, wherein the second storage means is connected to a pressure holding line which may be connected to the pressurised medium source.

7. A hydrostatic drive according to claim 6, wherein the pressurised medium source is a feed device.

8. A hydrostatic drive according to claim 7, wherein the feed device includes a feed pump conveying flow into the feed line.

9. A hydrostatic drive according to claim 8, wherein the feed line may be connected by way of a switch valve to the pressure holding line.

10. A hydrostatic drive according to claim 8, wherein the feed line is connected to the pressure holding line by way of a nonreturn valve which is open towards the pressure holding line.

\* \* \* \* \*